US009563065B2

(12) United States Patent
Yasui et al.

(10) Patent No.: US 9,563,065 B2
(45) Date of Patent: Feb. 7, 2017

(54) OPTICAL MODULE AND METHOD OF MANUFACTURING THE SAME

(71) Applicant: Mitsubishi Electric Corporation, Tokyo (JP)

(72) Inventors: Nobuyuki Yasui, Tokyo (JP); Koichi Nakamura, Tokyo (JP); Tatsuo Hatta, Tokyo (JP); Tetsuhiro Fukao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/042,873

(22) Filed: Feb. 12, 2016

(65) Prior Publication Data

US 2016/0377880 A1    Dec. 29, 2016

(30) Foreign Application Priority Data

Jun. 23, 2015 (JP) ................. 2015-125705

(51) Int. Cl.
| | |
|---|---|
| *G02B 27/10* | (2006.01) |
| *H04J 14/00* | (2006.01) |
| *G02B 27/62* | (2006.01) |
| *G02B 6/42* | (2006.01) |
| *G02B 27/30* | (2006.01) |

(52) U.S. Cl.
CPC ............. *G02B 27/62* (2013.01); *G02B 6/422* (2013.01); *G02B 6/4214* (2013.01); *G02B 6/4215* (2013.01); *G02B 6/4219* (2013.01); *G02B 27/10* (2013.01); *G02B 27/106* (2013.01); *G02B 27/1006* (2013.01); *H04J 14/00* (2013.01); *G02B 27/30* (2013.01)

(58) Field of Classification Search
CPC ... G02B 6/4214; G02B 6/4215; G02B 6/4219; G02B 6/422; G02B 6/4226; G02B 6/4228; G02B 6/423; G02B 6/4244; G02B 6/4245; G02B 6/4246; G02B 6/425; G02B 6/29365; G02B 6/29367; G02B 6/2938; G02B 6/29389; G02B 6/3636; G02B 27/10; G02B 27/1006; G02B 27/106; G02B 27/123; G02B 27/30; H04J 14/00; H04J 14/02
USPC ....... 359/618, 619, 629, 641; 398/43, 76, 79, 398/85, 140, 142; 385/16, 24, 31, 37
See application file for complete search history.

(56) References Cited

U.S. PATENT DOCUMENTS

| | | | |
|---|---|---|---|
| 5,009,481 A | 4/1991 | Kinoshita et al. | |
| 6,301,407 B1 * | 10/2001 | Donaldson | ......... G02B 6/29365 385/16 |
| 7,762,730 B2 * | 7/2010 | Kihara | ................. G02B 6/4246 385/88 |

(Continued)

FOREIGN PATENT DOCUMENTS

JP     02-139506     5/1990

OTHER PUBLICATIONS

Hiroshi Aruga et al. "Four-channel 25Gbps Optical Receiver for 100 Gbps Ethernet with Built-in Demultiplexer Optics" (ECOC2010—36th European Conference and Exhibition on Optical Communication Programme).

*Primary Examiner* — Loha Ben
(74) *Attorney, Agent, or Firm* — Studebaker & Brackett PC

(57) ABSTRACT

An optical module includes: a pedestal; a glass optical multiplexer/demultiplexer fixed onto the pedestal via a UV adhesive; and a metal block which is smaller than the glass optical multiplexer/demultiplexer and is fixed to a top surface of the glass optical multiplexer/demultiplexer.

10 Claims, 6 Drawing Sheets

(56) References Cited

U.S. PATENT DOCUMENTS 8,380,075 B2 *  2/2013  Sakigawa ............ G02B 6/4201
                                                   398/128
9,229,167 B2 *  1/2016  Chang .................. G02B 6/4215

* cited by examiner

OPTICAL MODULE AND METHOD OF MANUFACTURING THE SAME

BACKGROUND OF THE INVENTION

Field of the Invention

The present invention relates to an optical module provided with an optical multiplexer/demultiplexer that multiplexes or demultiplexes light and a method of manufacturing the same.

Background Art

Conventional optical modules align lenses at desired positions using a lens holder into which a lens is inserted and a holder guide, and fix members thereof through laser welding or the like. The material of the lens holder and the holder guide is stainless steel, steel, Kovar or the like (e.g., see Japanese Patent Application Laid-Open No. 2-139506). There is also a proposal of an optical module using a glass prism for an optical multiplexer/demultiplexer (e.g., see "Four-channel 25 Gbps Optical Receiver for 100 Gbps Ethernet (registered trademark) with Built-in Demultiplexer Optics" Optical Communication (ECOC), 2010 36th European Conference, Mitsubishi Electric Corporation, written by Aruga).

When fixing the lens holder and the holder guide through UV adhesion after alignment of lenses, the optical module described in Japanese Patent Application Laid-Open No. 2-139506 poses a problem that UV light is kicked by the metallic lens holder or holder guide and the lens position cannot be fixed.

Regarding the optical module described in "Four-channel 25 Gbps Optical Receiver for 100 Gbps Ethernet (registered trademark) with Built-in Demultiplexer Optics" Optical Communication (ECOC), 2010 36th European Conference, Mitsubishi Electric Corporation, written by Aruga, when the optical multiplexer/demultiplexer is held for alignment, the glass optical multiplexer/demultiplexer must not be damaged. For this reason, the optical multiplexer/demultiplexer needs to be held using, for example, a suctioning apparatus having a large area. Moreover, the optical multiplexer/demultiplexer is fixed to a pedestal using an adhesive. When an attempt is made to align the multiplexer/demultiplexer while keeping the multiplexer/demultiplexer in contact with the adhesive using the suctioning apparatus, the glass optical multiplexer/demultiplexer comes off the suctioning apparatus by yielding to the viscosity of the adhesive, making it difficult to make alignment at an appropriate position. Thus, after making alignment at a position at which the optical multiplexer/demultiplexer is caused to float from the adhesive, the optical multiplexer/demultiplexer is dismounted and caused to come into contact with the adhesive. Therefore, alignment is performed at a position different from the position where the optical multiplexer/demultiplexer should originally be fixed, and misalignment may occur when the optical multiplexer/demultiplexer is dismounted. This results in a problem that the optical multiplexer/demultiplexer cannot be fixed at an optimal position.

SUMMARY OF THE INVENTION

The present invention has been implemented to solve the above-described problems and it is an object of the present invention to provide an optical module and a manufacturing method thereof capable of easily aligning an optical multiplexer/demultiplexer while keeping it optical module in contact with an adhesive.

According to the present invention, an optical module includes: a pedestal; a glass optical multiplexer/demultiplexer fixed onto the pedestal via a UV adhesive; and a metal block which is smaller than the glass optical multiplexer/demultiplexer and is fixed to a top surface of the glass optical multiplexer/demultiplexer.

The present invention provides the metal block on the top surface of the optical multiplexer/demultiplexer and thereby eliminates the need to hold the glass optical multiplexer/demultiplexer which is fragile. Furthermore, since the holding jig can firmly hold the metal block, the optical multiplexer/demultiplexer never comes off yielding to the viscosity of the UV adhesive. As a result, the optical multiplexer/demultiplexer can be easily aligned while in contact with the UV adhesive.

Other and further objects, features and advantages of the invention will appear more fully from the following description.

DETAILED DESCRIPTION OF THE PREFERRED EMBODIMENTS

An optical module and a method of manufacturing the same according to the embodiments of the present invention will be described with reference to the drawings. The same components will be denoted by the same symbols, and the repeated description thereof may be omitted.

First Embodiment

Figure 1:
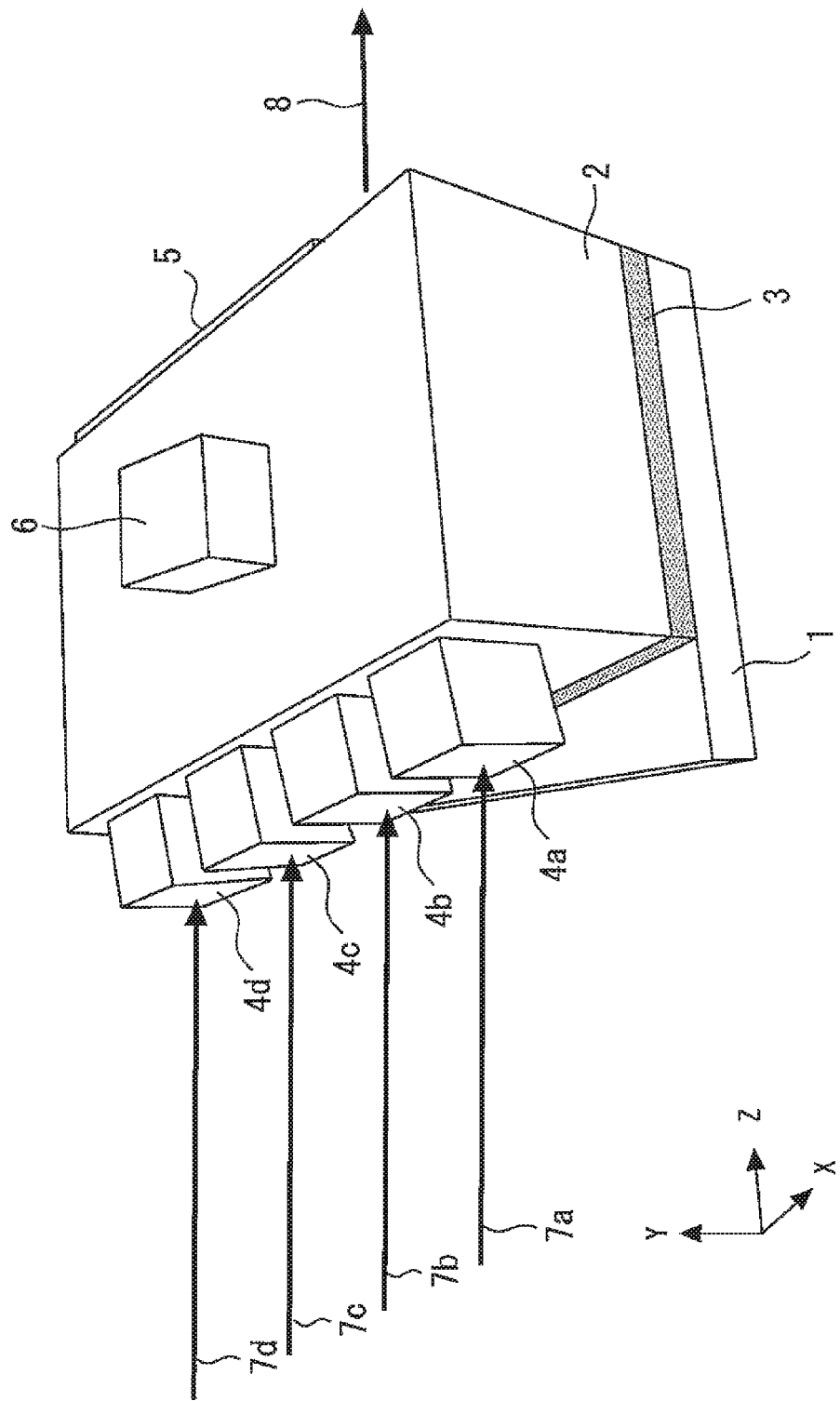
FIG. 1 is a perspective view illustrating an optical module according to a first embodiment of the present invention.

FIG. 1 is a perspective view illustrating an optical module according to a first embodiment of the present invention. A glass optical multiplexer/demultiplexer 2 is fixed onto a pedestal 1 via a UV adhesive 3. The pedestal 1 is made of metal, ceramics, glass or the like. The UV adhesive 3 has a property of hardening when irradiated with UV light.

Filters 4a, 4b, 4c and 4d obtained by applying coating including different passbands and stopbands to surfaces of respective glass members are fixed to a first side face of the optical multiplexer/demultiplexer 2 using an adhesive or the like. A mirror 5 obtained by applying reflective coating to a surface of a glass member is fixed to a second side face opposite to the first side face of the optical multiplexer/demultiplexer 2 using an adhesive or the like.

A metal block 6 which is smaller than the optical multiplexer/demultiplexer 2 is fixed to a top surface of the optical multiplexer/demultiplexer 2 using an adhesive or the like. The plane shape of the metal block 6 is rectangular.

Incident collimated light beams 7a, 7b, 7c and 7d having different center wavelengths $\lambda 0$, $\lambda 1$, $\lambda 2$ and $\lambda 3$ emitted from laser diodes or the like are incident on the optical multiplexer/demultiplexer 2 via the filters 4a, 4b, 4c and 4d respectively. The optical multiplexer/demultiplexer 2 multiplexes the incident collimated light beams 7a, 7b, 7c and 7d and emits the multiplexed beam as an outgoing collimated light beam 8.

More specifically, the incident collimated light beam 7a having the wavelength $\lambda 0$ passes through the filter 4a which transmits the wavelength $\lambda 0$, passes through the optical multiplexer/demultiplexer 2 and becomes part of the outgoing collimated light beam 8.

The incident collimated light beam 7b having the wavelength $\lambda 1$ passes through the filter 4b which transmits the wavelength $\lambda 1$, passes through the optical multiplexer/demultiplexer 2, is totally reflected by the mirror 5, passes through the optical multiplexer/demultiplexer 2 toward the filter 4a, is totally reflected by the filter 4a for which the wavelengths $\lambda 1$, $\lambda 2$ and $\lambda 3$ become stopbands, passes through the optical multiplexer/demultiplexer 2 and becomes part of the outgoing collimated light beam 8.

The incident collimated light beam 7c of the wavelength $\lambda 2$ passes through the filter 4c which transmits the wavelength $\lambda 2$, passes through the optical multiplexer/demultiplexer 2, is totally reflected by the mirror 5, passes through the optical multiplexer/demultiplexer 2 toward the filter 4b, is totally reflected by the filter 4b for which the wavelengths $\lambda 2$ and $\lambda 3$ become stopbands, passes through the optical multiplexer/demultiplexer 2, is totally reflected by the mirror 5, passes through the optical multiplexer/demultiplexer 2 toward the filter 4a, is totally reflected by the filter 4a for which the wavelengths $\lambda 1$, $\lambda 2$ and $\lambda 3$ become stopbands, passes through the optical multiplexer/demultiplexer 2 and becomes part of the outgoing collimated light beam 8.

The incident collimated light beam 7d of the wavelength $\lambda 3$ passes through the filter 4d which transmits the wavelength $\lambda 3$, passes through the optical multiplexer/demultiplexer 2, is totally reflected by the mirror 5, passes through the optical multiplexer/demultiplexer 2 toward the filter 4c, is totally reflected by the filter 4c for which the wavelength $\lambda 3$ become a stopband, passes through the optical multiplexer/demultiplexer 2, is totally reflected by the mirror 5, passes through the optical multiplexer/demultiplexer 2 toward the filter 4b, is totally reflected by the filter 4b for which the wavelengths $\lambda 2$ and $\lambda 3$ become stopbands, passes through the optical multiplexer/demultiplexer 2, is totally reflected by the mirror 5, passes through the optical multiplexer/demultiplexer 2 toward the filter 4a, is totally reflected by the filter 4a for which the wavelengths $\lambda 1$, $\lambda 2$ and $\lambda 3$ become stopbands, passes through the optical multiplexer/demultiplexer 2 and becomes part of the outgoing collimated light beam 8.

Figure 2:
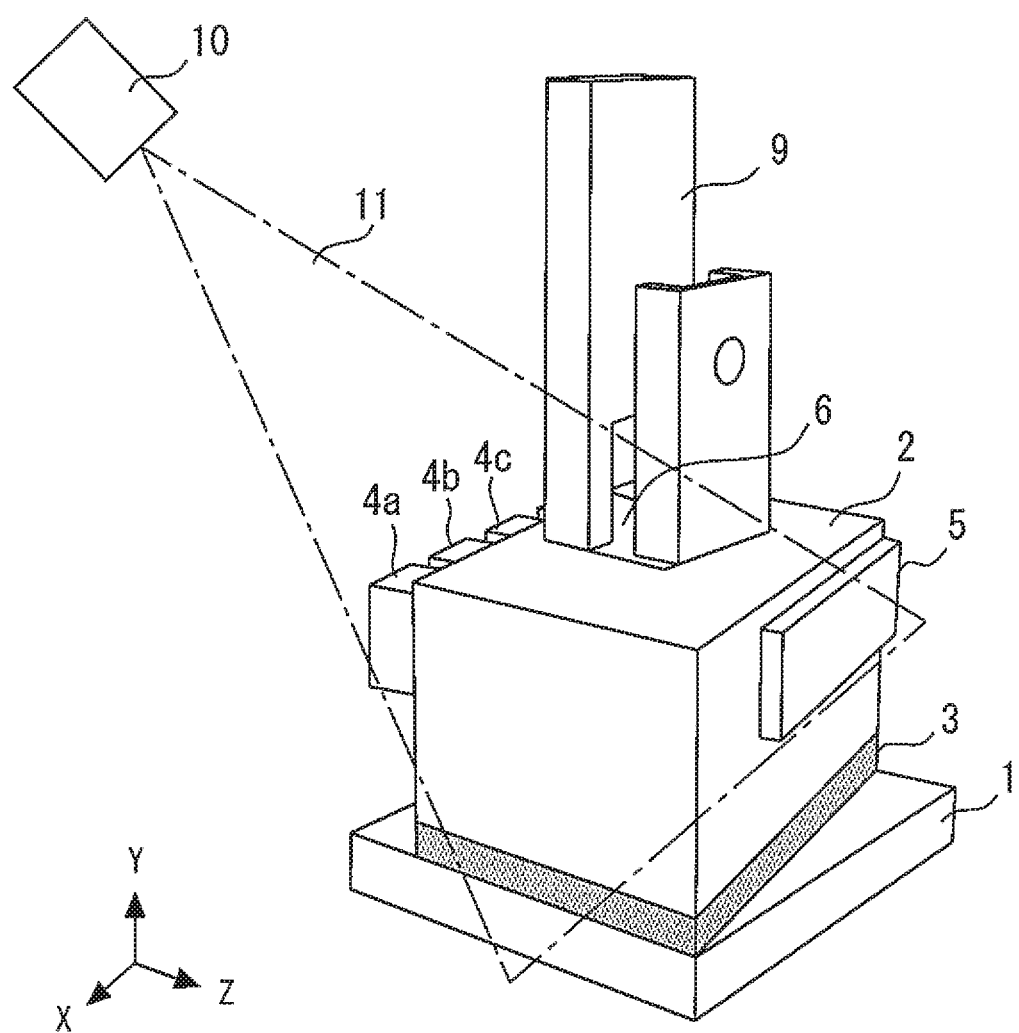
FIG. 2 is a perspective view illustrating the method of manufacturing the optical module according to the first embodiment of the present invention.

Next, a method of manufacturing the optical module according to the present embodiment will be described. FIG. 2 is a perspective view illustrating the method of manufacturing the optical module according to the first embodiment of the present invention. First, a metal block 6 which is smaller than the optical multiplexer/demultiplexer 2 is fixed to the top surface of the glass optical multiplexer/demultiplexer 2.

Next, the metal block 6 fixed to the optical multiplexer/demultiplexer 2 is held (mechanically chucked) using a metal holding jig 9 such as SUS. With the undersurface of the optical multiplexer/demultiplexer 2 kept in contact with the UV adhesive 3 applied to the top surface of the pedestal 1, the metal block 6 and the optical multiplexer/demultiplexer 2 are moved in X, Y and Z directions and $\theta y$ and $\theta x$ directions, and the optical multiplexer/demultiplexer 2 is aligned at an optimum position. After that, the UV light source 10 radiates UV light 11 onto the optical multiplexer/demultiplexer 2 from above. This causes the UV light 11 to pass through the optical multiplexer/demultiplexer 2, and to radiate onto the UV adhesive 3 below the optical multiplexer/demultiplexer 2 to harden the UV adhesive 3.

As described above, the present embodiment provides the metal block 6 on the top surface of the optical multiplexer/demultiplexer 2 and thereby eliminates the need to hold the glass optical multiplexer/demultiplexer 2 which is fragile. Furthermore, since the holding jig 9 can firmly hold the metal block 6, the optical multiplexer/demultiplexer 2 never comes off yielding to the viscosity of the UV adhesive 3. As a result, the optical multiplexer/demultiplexer 2 can be easily aligned while in contact with the UV adhesive 3. The present embodiment is extremely effective particularly for a product such as an optical integrated module whose mounting size in the X direction cannot be sufficiently secured.

Since the UV light 11 passes through the glass optical multiplexer/demultiplexer 2, the optical multiplexer/demultiplexer 2 can be fixed at an optimum aligned position. In this case, the metal block 6 smaller than the optical multiplexer/demultiplexer 2 does not obstruct the UV light 11.

Second Embodiment

Figure 3:
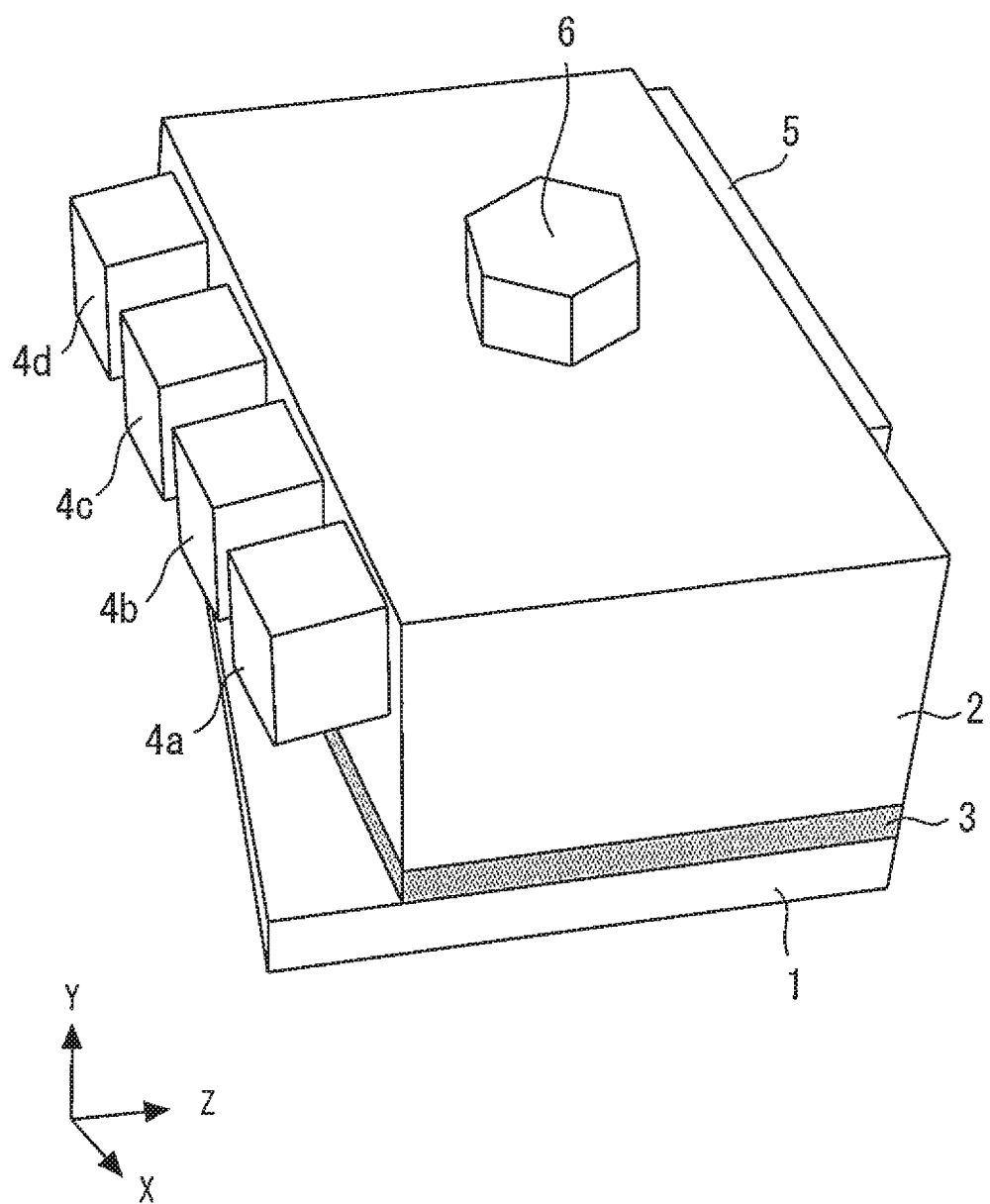
FIG. 3 is a perspective view illustrating an optical module according to a second embodiment of the present invention.

FIG. 3 is a perspective view illustrating an optical module according to a second embodiment of the present invention. The plane shape of the metal block 6 is hexagonal. With two sides of the hexagon of the metal block 6 held using the holding jig 9, the optical multiplexer/demultiplexer 2 is moved in the X, Y and Z directions and the $\theta y$ and $\theta x$ directions.

Alternatively, three sides of the hexagon of the metal block 6 can also be held using the holding jig 9. This allows the metal block 6 to be mechanically chucked from three directions, and so the degree of freedom of design of the holding jig 9 and mounting operability can be improved. Other configurations, processes and effects are similar to those of the first embodiment.

Third Embodiment

Figure 4:
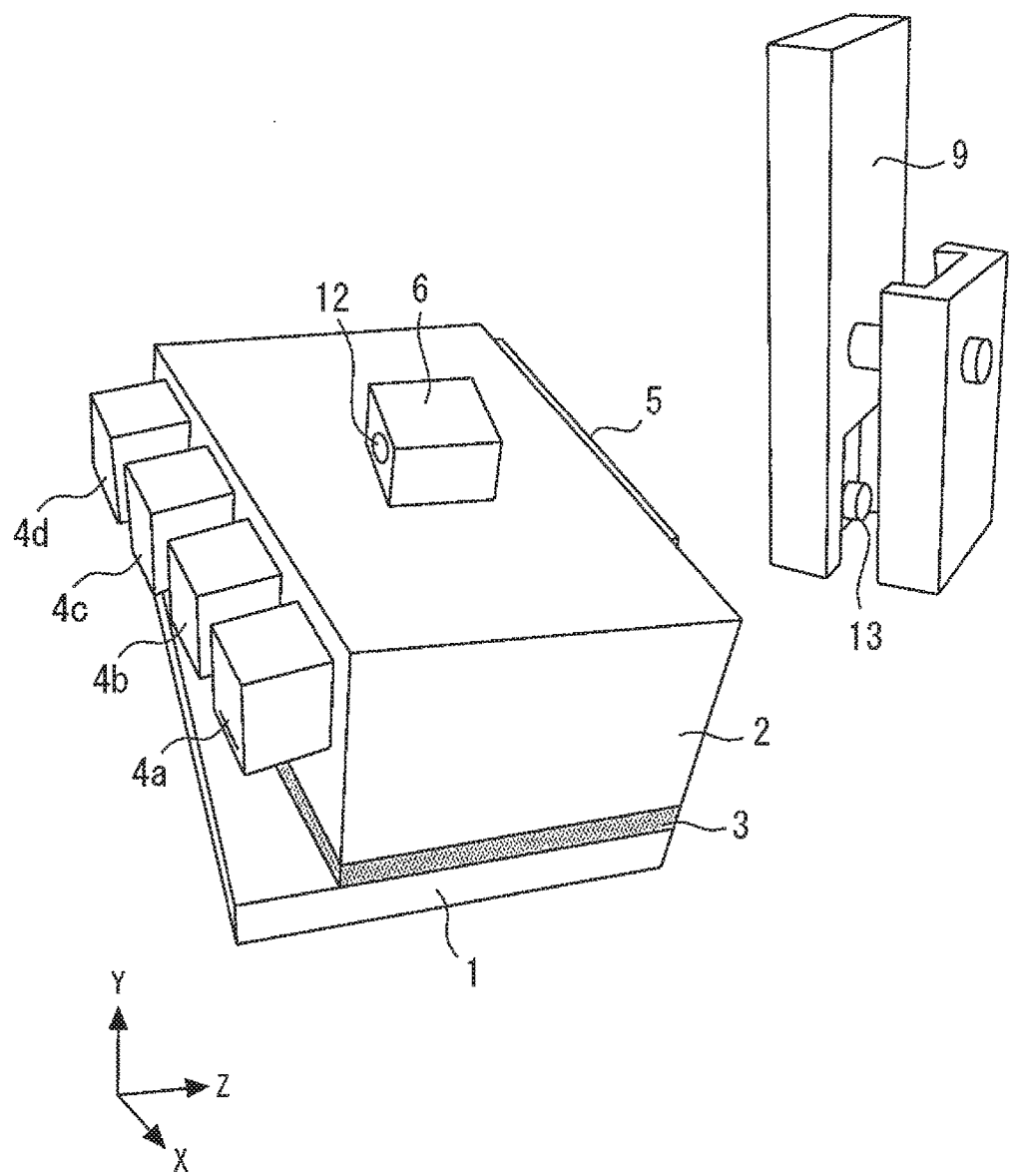
FIG. 4 is a perspective view illustrating an optical module and a holding jig according to a third embodiment of the present invention.

FIG. 4 is a perspective view illustrating an optical module and a holding jig according to a third embodiment of the present invention. A hole 12 is provided in a side face of the metal block 6. The metal block 6 is held using the holding jig 9 while inserting a lateral protrusion 13 of the holding jig 9 into the hole 12 of the metal block 6. The metal block 6 can be further firmly held in this way. Other configurations, processes and effects are similar to those of the first embodiment.

Fourth Embodiment

Figure 5:
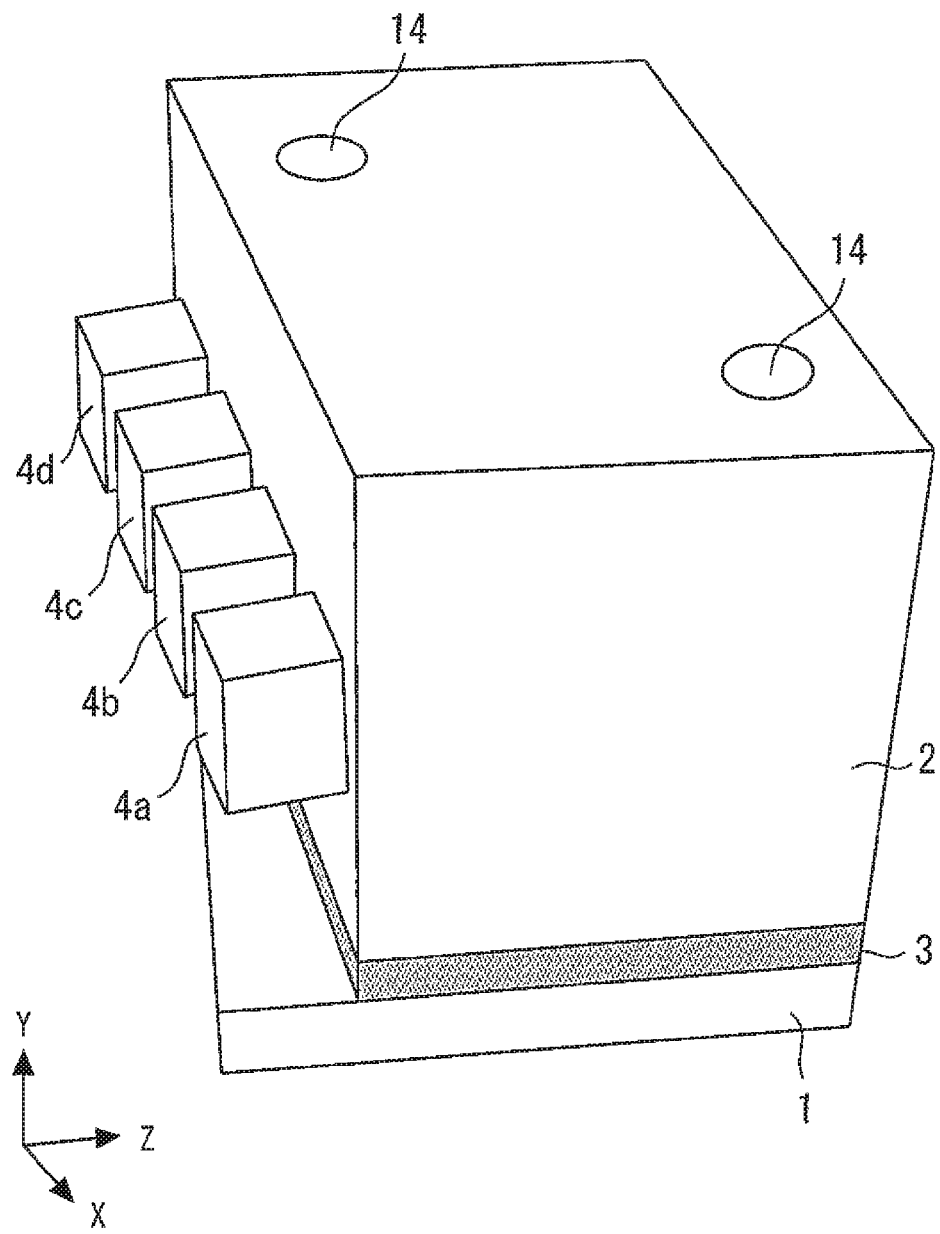
FIG. 5 is a perspective view illustrating an optical module according to a fourth embodiment of the present invention.

FIG. 5 is a perspective view illustrating an optical module according to a fourth embodiment of the present invention. Instead of using the metal block 6, the height of the optical multiplexer/demultiplexer 2 is increased and a plurality of (two or more) holes 14 are provided in the top surface of the optical multiplexer/demultiplexer 2. The holes 14 may be formed straight downward or diagonally.

Next, a method of manufacturing the optical module according to the present embodiment will be described. First, the glass optical multiplexer/demultiplexer 2 is prepared which is provided with the plurality of holes 14 in the top surface. Next, with a plurality of downward protrusions of the holding jig 9 inserted into the plurality of holes 14 of the optical multiplexer/demultiplexer 2, the optical multiplexer/demultiplexer 2 is held by the holding jig 9. While keeping the undersurface of the optical multiplexer/demultiplexer 2 in contact with the UV adhesive 3 applied to the top surface of the pedestal 1, the optical multiplexer/demultiplexer 2 is moved in the X, Y and Z directions and the θy and θx directions to align the optical multiplexer/demultiplexer 2. After that, the UV light 11 is caused to pass through the optical multiplexer/demultiplexer 2 and radiate onto the UV adhesive 3 to harden the UV adhesive 3.

By inserting the protrusions of the holding jig 9 into the plurality of holes 14 of the optical multiplexer/demultiplexer 2, it is possible to firmly hold the optical multiplexer/demultiplexer 2 without breaking it. As a result, while in contact with the UV adhesive 3, the optical multiplexer/demultiplexer 2 can be easily aligned. Furthermore, without mounting any additional member such as the metal block 6, it is possible to hold the optical multiplexer/demultiplexer 2 and reduce the cost.

Fifth Embodiment

Figure 6:
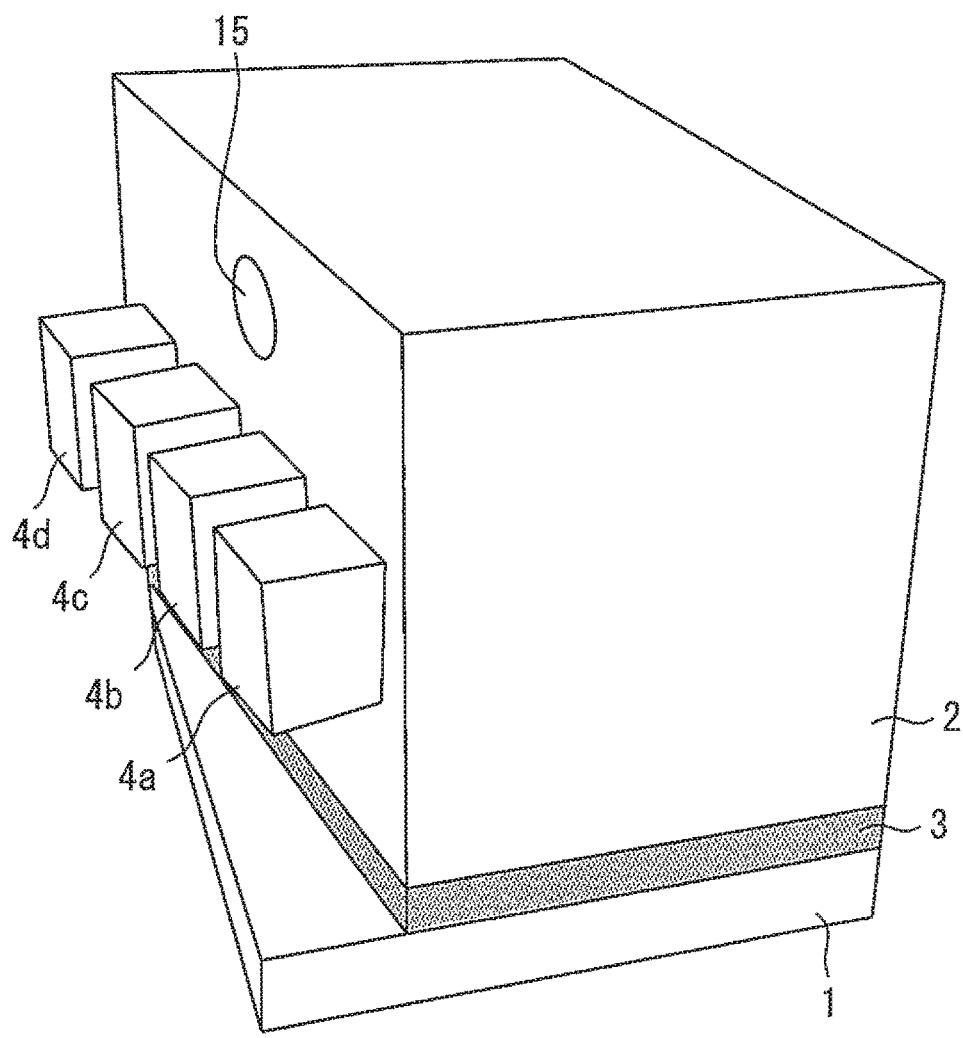
FIG. 6 is a perspective view illustrating an optical module according to a fifth embodiment of the present invention.

FIG. 6 is a perspective view illustrating an optical module according to a fifth embodiment of the present invention. Instead of using the metal block 6, the height of the optical multiplexer/demultiplexer 2 is increased and one hole 15 is formed in an upper side face of the optical multiplexer/demultiplexer 2.

Next, a method of manufacturing the optical module according to the present embodiment will be described. First, the glass optical multiplexer/demultiplexer 2, the upper side face of which is provided with the hole 15, is prepared. Next, the optical multiplexer/demultiplexer 2 is held by the holding jig 9 while inserting a cylindrical lateral protrusion of the holding jig 9 into the hole 15 of the optical multiplexer/demultiplexer 2. With the undersurface of the optical multiplexer/demultiplexer 2 kept in contact with the UV adhesive 3 applied to the top surface of the pedestal 1, the optical multiplexer/demultiplexer 2 is moved in the X, Y and Z directions and the θy and θx direction to assign the optical multiplexer/demultiplexer 2. After that, the UV light 11 is caused to pass through the optical multiplexer/demultiplexer 2 and radiate onto the UV adhesive 3 to harden the UV adhesive 3.

By inserting the protrusion of the holding jig 9 into the hole 15 of the optical multiplexer/demultiplexer 2, it is possible to firmly hold the optical multiplexer/demultiplexer 2 without breaking it. As a result, the optical multiplexer/demultiplexer 2 can be easily aligned while kept in contact with the UV adhesive 3. Furthermore, since the hole 15 of the optical multiplexer/demultiplexer 2 can be formed by a single process, it is possible to reduce the processing cost.

Obviously many modifications and variations of the present invention are possible in the light of the above teachings. It is therefore to be understood that within the scope of the appended claims the invention may be practiced otherwise than as specifically described. The entire disclosure of Japanese Patent Application No. 2015-125705, filed on Jun. 23, 2015 including specification, claims, drawings and summary, on which the Convention priority of the present application is based, is incorporated herein by reference in its entirety.

What is claimed is:

1. An optical module comprising:
a pedestal;
a glass optical multiplexer/demultiplexer fixed onto the pedestal via a UV adhesive; and
a metal block which is smaller than the glass optical multiplexer/demultiplexer and is fixed to a top surface of the glass optical multiplexer/demultiplexer.

2. The optical module of claim 1, wherein a plane shape of the metal block is hexagonal.

3. The optical module of claim 1, wherein a hole is provided in a side face of the metal block.

4. An optical module comprising:
a pedestal; and
a glass optical multiplexer/demultiplexer fixed onto the pedestal via a UV adhesive,
wherein a plurality of holes are provided in a top surface of the glass optical multiplexer/demultiplexer.

5. An optical module comprising:
a pedestal; and
a glass optical multiplexer/demultiplexer fixed onto the pedestal via a UV adhesive,
wherein a hole is provided in an upper side face of the glass optical multiplexer/demultiplexer.

6. A method of manufacturing an optical module comprising:
fixing a metal block which is smaller than a glass optical multiplexer/demultiplexer to a top surface of the glass optical multiplexer/demultiplexer;
holding the metal block fixed to the glass optical multiplexer/demultiplexer using a holding jig and moving the metal block and the glass optical multiplexer/demultiplexer to align the glass optical multiplexer/demultiplexer with an undersurface of the glass optical multiplexer/demultiplexer kept in contact with a UV adhesive applied to a top surface of a pedestal; and
after aligning the glass optical multiplexer/demultiplexer, causing UV light to pass through the glass optical multiplexer/demultiplexer and to radiate onto the UV adhesive to harden the UV adhesive.

7. The method of manufacturing an optical module of claim 6, wherein a plane shape of the metal block is hexagonal.

8. The method of manufacturing an optical module of claim 6, wherein a hole is provided in a side face of the metal block, and
the metal block is held using the holding jig while inserting a lateral protrusion of the holding jig into the hole of the metal block.

9. A method of manufacturing an optical module comprising:
preparing a glass optical multiplexer/demultiplexer wherein a plurality of holes are provided in a top surface of the glass optical multiplexer/demultiplexer;
holding the glass optical multiplexer/demultiplexer using a holding jig while inserting a plurality of downward protrusions of the holding jig into the plurality of holes of the glass optical multiplexer/demultiplexer and moving the glass optical multiplexer/demultiplexer to align the glass optical multiplexer/demultiplexer with an undersurface of the glass optical multiplexer/demultiplexer kept in contact with a UV adhesive applied to a top surface of a pedestal; and
after aligning the glass optical multiplexer/demultiplexer, causing UV light to pass through the glass optical multiplexer/demultiplexer and to radiate onto the UV adhesive to harden the UV adhesive.

10. A method of manufacturing an optical module comprising:
  preparing a glass optical multiplexer/demultiplexer wherein a hole is provided in an upper side face of the glass optical multiplexer/demultiplexer;
  holding the glass optical multiplexer/demultiplexer using a holding jig while inserting a lateral protrusion of the holding jig into the hole of the glass optical multiplexer/demultiplexer and moving the glass optical multiplexer/demultiplexer to align the glass optical multiplexer/demultiplexer with an undersurface of the glass optical multiplexer/demultiplexer kept in contact with a UV adhesive applied to a top surface of a pedestal; and
  after aligning the glass optical multiplexer/demultiplexer, causing UV light to pass through the glass optical multiplexer/demultiplexer and to radiate onto the UV adhesive to harden the UV adhesive.

\* \* \* \* \*